(12) United States Patent
Park

(10) Patent No.: US 8,351,475 B2
(45) Date of Patent: Jan. 8, 2013

(54) LASER DEVICE

(75) Inventor: Wonhee Park, Jillyang-eup Gyeongsan-si (KR)

(73) Assignee: Jawon Medical Co., Ltd., Gueongsangbuk-Do (KR)

( * ) Notice: Subject to any disclaimer, the term of this patent is extended or adjusted under 35 U.S.C. 154(b) by 0 days.

(21) Appl. No.: 13/259,988

(22) PCT Filed: Jun. 17, 2010

(86) PCT No.: PCT/KR2010/003921
§ 371 (c)(1),
(2), (4) Date: Sep. 23, 2011

(87) PCT Pub. No.: WO2011/031000
PCT Pub. Date: Mar. 17, 2011

(65) Prior Publication Data
US 2012/0033687 A1 Feb. 9, 2012

(30) Foreign Application Priority Data
Sep. 9, 2009 (KR) .................. 10-2009-0084821
Mar. 17, 2010 (KR) .................. 10-2010-0023607

(51) Int. Cl.
*H01S 3/10* (2006.01)
*H01S 3/11* (2006.01)
*H01S 3/08* (2006.01)

(52) U.S. Cl. .................. 372/20; 372/9; 372/10; 372/99

(58) Field of Classification Search .............. 372/10, 372/20, 69, 72, 92, 98–99, 9, 15
See application file for complete search history.

(56) References Cited

U.S. PATENT DOCUMENTS

| 5,249,192 A * | 9/1993 | Kuizenga et al. | 372/23 |
| 6,539,035 B1 | 3/2003 | Yoda et al. | |
| 6,580,732 B1 * | 6/2003 | Guch et al. | 372/18 |
| 7,672,346 B1 * | 3/2010 | Bass et al. | 372/34 |
| 7,852,887 B2 * | 12/2010 | Brotherton-Ratcliffe | 372/29.02 |
| 8,207,474 B2 * | 6/2012 | Dane et al. | 219/121.85 |
| 2006/0126674 A1 * | 6/2006 | Sun et al. | 372/10 |
| 2006/0187975 A1 * | 8/2006 | Koroshetz et al. | 372/10 |
| 2007/0258493 A1 | 11/2007 | Kennedy | |
| 2009/0097507 A1 | 4/2009 | Zhu et al. | |

* cited by examiner

*Primary Examiner* — Jessica Stultz
*Assistant Examiner* — Phillip Nguyen
(74) *Attorney, Agent, or Firm* — Birch, Stewart, Kolasch & Birch, LLP

(57) ABSTRACT

Disclosed is a laser device. The laser device includes a pulse generator which irradiates a laser beam between a high reflector mirror and an output coupler mirror to amplify and resonate the laser beam, a pulse output section which receives a laser beam pulse amplified and resonated through the output coupler mirror to output the laser beam pulse, and a Q switch which moves backward or forward in a direction perpendicular to a path of the laser beam formed between the pulse generator and the high reflector mirror. The output coupler mirror includes first and second mirrors provided on a base plate. Positions of the first and second mirrors are selectively changed as the Q switch moves backward or forward.

8 Claims, 6 Drawing Sheets

LASER DEVICE

BACKGROUND OF THE INVENTION

1. Field of the invention

The present invention relates to a Q-switch Nd-YAG laser device. More particularly, the present invention relates to a laser device equipped with a pulse transformer to transform a laser beam into a long-pulse laser beam irradiated for a long period of time or a short-pulse laser beam having high energy.

2. Description of the Prior Art

In general, an Nd-YAG laser device irradiates a laser beam having a wavelength of about 1064 nm in a near infrared ray band by activating a yttrium aluminum garnet crystal doped with 1% to 3% of $Nd^{3+}$ ions using a high pressure flash discharge tube.

The Nd-YAG laser device can transform a 1064 nm wavelength band having a long pulse width into a Q switch pulse, that is, a 1064 nm wavelength band having an extremely short pulse width and high output energy by using a Q switch, which is generally known to those skilled in the art, to control distribution reversion energy of a pulse by covering a portion of a laser reflector.

Since the laser device using a 1064 nm long pulse wavelength band represents longer laser beam irradiation time and a smaller amount of energy, the laser device has been used to treat vessel disease such as permanent hair removal, facial vasodilation, or vein vasodilation. In addition, the laser device has been extensively used in non-invasive therapy-facial skin rejuvenation.

The laser device using a 1064 nm pulse wavelength band that has been transformed into a short pulse having a short pulse width and high output energy treats lesion placed into a deep dermis, and is mainly used for nevus of ota, eyebrow tattoo, or eyeline tattoo.

The Nd-YAG laser device uses a 1064 nm long pulse wavelength band, and includes a Q switch to transform the laser beam into a short pulse laser beam. In this case, the laser device may have a complex structure. Accordingly, the small-sized laser device cannot be realized. In addition, the manufacturing cost may be increased.

SUMMARY OF THE INVENTION

Accordingly, the present invention has been made to solve the above-mentioned problems occurring in the prior art. An object of the present invention is to provide a laser device capable of effectively outputting a laser beam while transforming the laser beam by improving the installation structure and the operating procedure of a Q switch, a pulse generator, and an output coupler mirror.

Another object of the present invention is to provide a laser device which can be extensively used in various fields with improved functions.

Still another object of the present invention is to provide a laser device having improved functions with the reduced manufacturing cost.

In order to accomplish the above objects, there is provided a laser device including a pulse generator which irradiates a laser beam between a high reflector mirror and an output coupler mirror to amplify and resonate the laser beam, a pulse output section which receives a laser beam pulse amplified and resonated through the output coupler mirror to output the laser beam pulse, and a Q switch which moves backward or forward in a direction perpendicular to a path of the laser beam formed between the pulse generator and the high reflector mirror. The output coupler mirror includes at least one mirror provided on a base plate.

The output coupler mirror includes first and second mirrors provided on a base plate, and positions of the first and second mirrors are selectively changed as the Q switch moves backward or forward.

The first and second mirrors are aligned on the base plate while forming a right angle therebetween.

The base plate provided therein with the first and second mirrors includes a rotatable circular plate, and a rotation plate driver, which restricts rotation of the base plate, and at least one limit switch, which detects a rotational angle of the base plate, are installed around the base plate.

The Q switch is mounted on a movable plate, and the movable plate moves backward or forward perpendicularly to the path of the laser beam, which is formed between the pulse generator and the high reflector mirror, by driving the movable plate driver provided below the movable plate.

The pulse generator includes an illuminance switching unit to adjust illuminance of the laser beam as the Q switch moves backward or forward.

The pulse generator includes a pair of lamps to emit light using a medium obtained by doping $Nd^{3+}$ ions into a YAG crystal, and the illuminace switching unit includes a switching circuit allowing the lamps to be connected to each other in series or in parallel.

The pulse generator 10 includes one lamp to emit light using a medium obtained by doping $Nd^{3+}$ ions into a YAG crystal, and the illuminance switching unit includes a power adjusting unit to adjust the output of the lamp.

The Q switch includes a quarter-wave mirror, a polarizer mirror, and a pockels cell provided between the quarter-wave mirror and the polarizer mirror. When the quarter-wave mirror and the polarizer mirror are positioned on a path of a laser beam formed between the high reflector mirror and the pulse generator, the pockels cell is instantaneously and repeatedly open due to high voltage at a moment at which maximum of density reversion of the laser beam occurs, to act as an electro-optical shutter.

As described above, according to the present invention, the Q switch moves backward or forward perpendicularly to the laser beam path between the pulse generator and the high reflector mirror to selectively perform Q-switching with respect to a laser beam pulse having a 1064 nm wavelength irradiated from the pulse generator. The output coupler mirror 30 includes the first and second mirrors aligned on a rotatable base plate while forming a right angle therebetween, so that the output coupler mirror can receive a laser beam output from the laser beam generator as the Q switch moves backward or forward along the optical path. Accordingly, the size of the laser device can be reduced, and a laser beam pulse is effectively transformed and output.

The laser device, which can expand the selective use range of a pulse width, can be manufactured at lower cost.

DETAILED DESCRIPTION OF THE PREFERRED EMBODIMENTS

Figure 1:
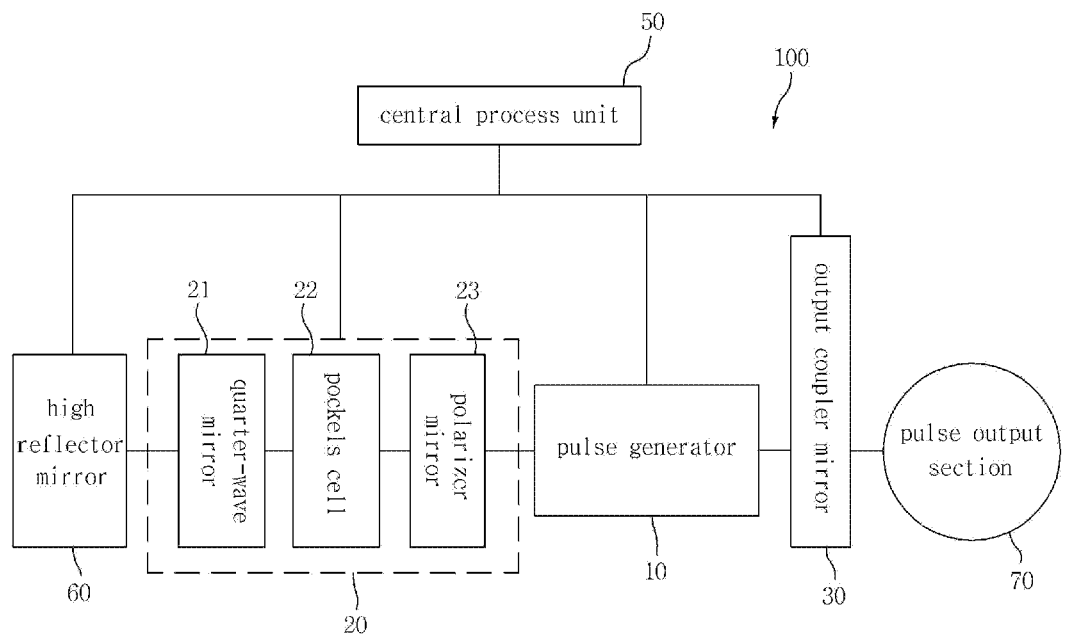
FIG. 1 is a block diagram showing a laser device according to the present invention.

Hereinafter, the technical structure and operation of a laser device 100 according to the present invention will be described with reference to FIGS. 1 to 14.

The laser device 100 according to the present invention includes a pulse generator 10, a Q switch 20, an output coupler mirror 30, a high reflector mirror 60, a CPU 50, and a pulse output section 70. In particular, output pulses of the laser device 100 can be transformed by controlling the driving of the Q switch 20, the output coupler mirror 30, and the pulse generator 10.

Figure 9:
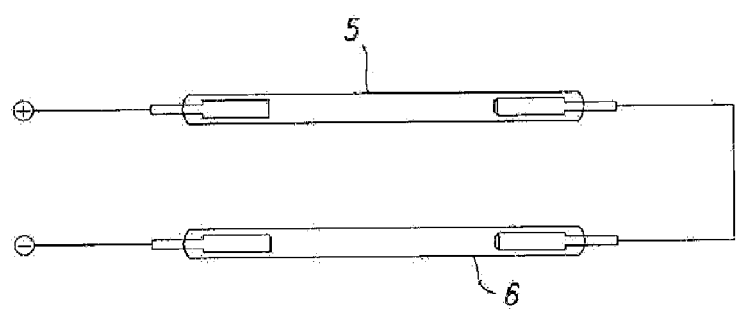
FIG. 9 is a schematic view the pulse transformer according the preset invention having lamps connected to each other in series.
Figure 10:
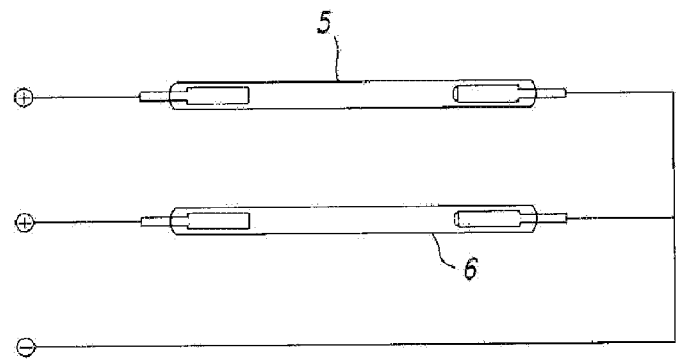
FIG. 10 is a schematic view showing the pulse generator according to the present invention having lamps connected to each other in parallel.

For example, as shown in FIGS. 9 and 10, the pulse generator 10 includes a pair of lamps 5 and 6 configured to generate a laser beam having a wavelength of about 1064 nm by using a rod 7 for a medium obtained by doping $Nd^{3+}$ ions into an $Y_2Al_5O_{12}$, and a switching circuit allowing the lamps 5 and 6 to be connected to each other in series or in parallel.

In addition, as shown in FIGS. 5 to 8, the Q switch 20 is mounted on a movable plate 25, and the movable plate 25 may move forward or backward by a movable plate driver 26 in a direction perpendicular to the optical path of a laser beam formed between the pulse generator 10 and the high reflector mirror 60.

Figure 5:
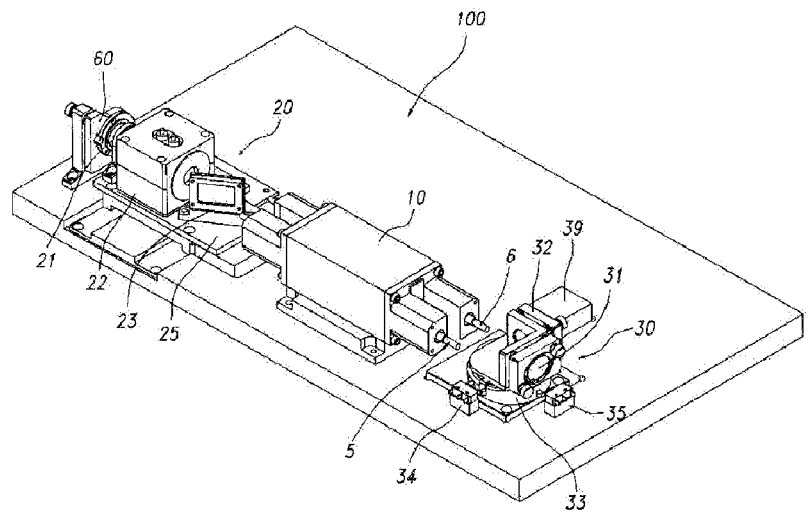
FIG. 5 is a perspective view showing the laser device according to the present invention in a state in which a Q switch moves forward.
Figure 6:
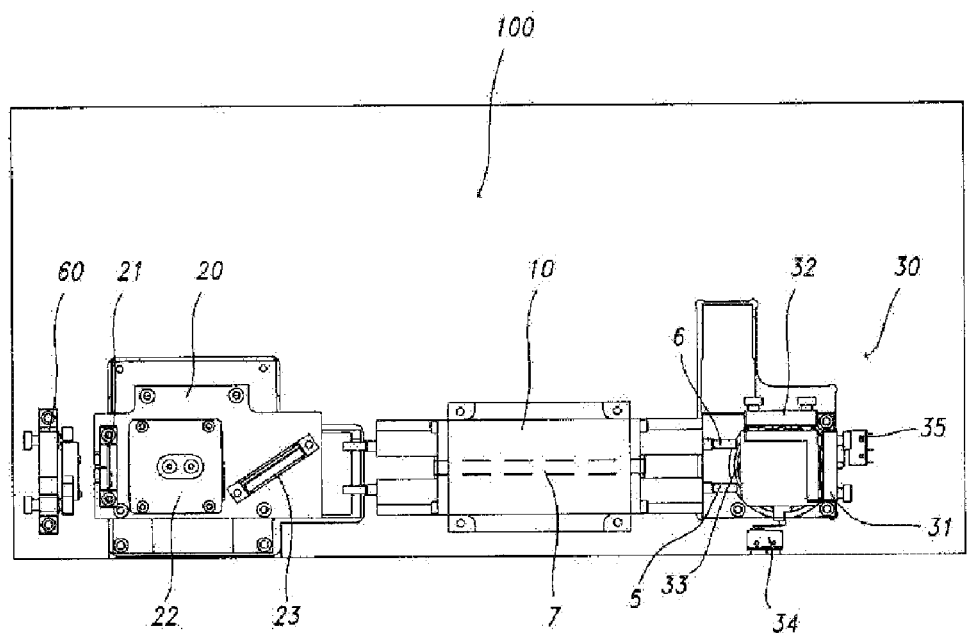
FIG. 6 is a plan view of FIG. 5.
Figure 7:
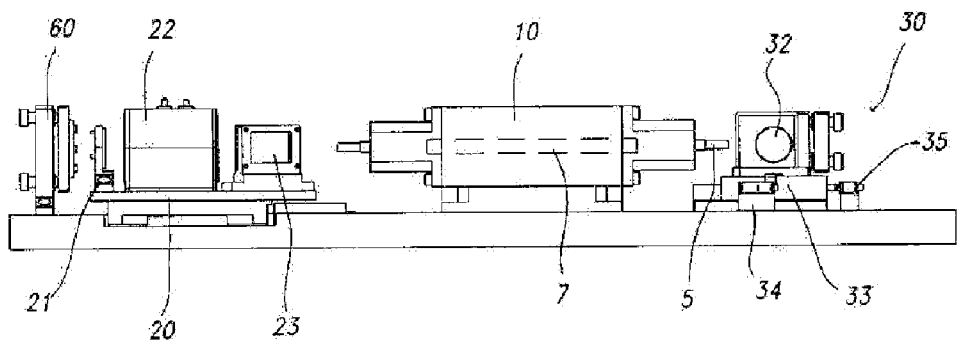
FIG. 7 is a sectional view of FIG. 5.
Figure 8:
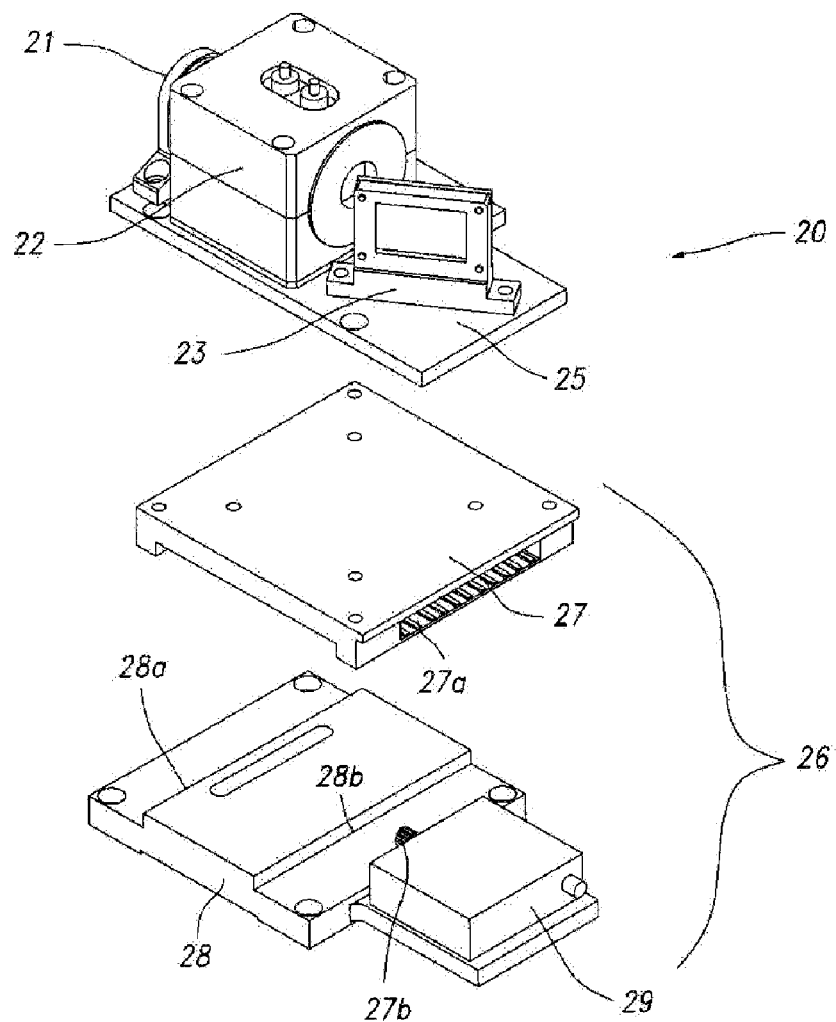
FIG. 8 is an exploded perspective view showing a subject matter of a Q switch according to the present invention and a device to move the Q switch.

As shown in FIG. 5, the output coupler mirror 30 includes first and second mirrors 31 and 32 arranged on a base plate 33, and the position of the first and second mirrors 31 and 32 may be changed as the Q switch 20 moves forward or backward.

Particularly, when the switching circuit of the pulse generator 10 drives the Q switch 20 to output a laser beam having a 1064 nm short pulse wavelength, the switching circuit switches the connection of the lamps 5 and 6 into the parallel connection of the lamps 5 and 6 to enhance power energy of the laser beam. When the switching circuit does not drive the Q switch 20 to output a 1064 nm wavelength laser beam in the form of a long pulse, since the power energy of the long pulse laser beam may be lower than or equal to the power energy of the short pulse laser beam, the switching circuit switches the connection of the lamps 5 and 6 into the series connection. In other words, the switching circuit of the pulse generator 10 acts as an illuminance switching unit to adjust the illuminance of the lamps 5 and 6.

Figure 11:
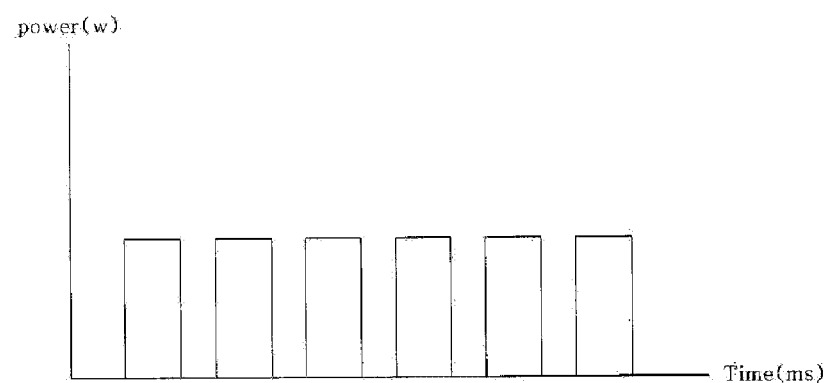
FIG. 11 is a graph showing laser beam pulses when the Q switch according to the present invention deviates from an optical path to move reward.
Figure 12:
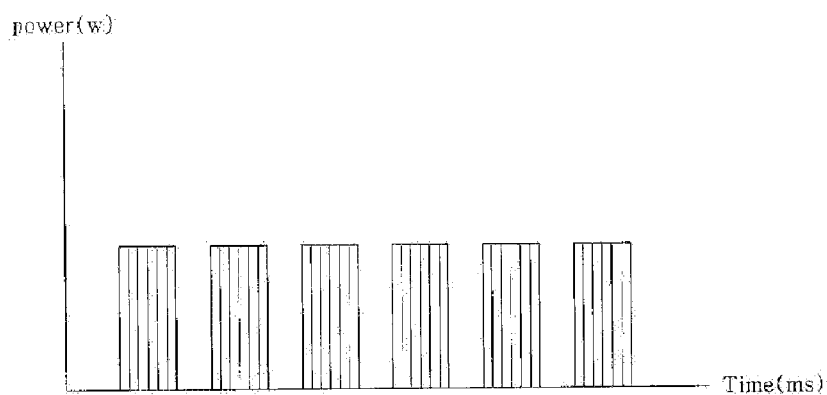
FIG. 12 is a graph showing another example of laser beam pulses when the Q switch according to the present invention deviates from an optical path to move reward.
Figure 13:
FIG. 13 is a view showing laser beam pulses when the Q switch according to the present invention moves forward to the position on the optical path of the laser beam.

The long and short pulses of the laser beam having a wavelength of 1064 nm, which have been described according to the present invention, are relatively defined. In other words, as shown in FIGS. 11 and 12, a pulse having the width of about 1 ms to 450 nm is defined as the long pulse. As shown in FIG. 13, a pulse having the width of about 1 ns to about 50 ns is defined as a short pulse.

Preferably, according to the laser device of the present invention, the width of the long pulse is in the range of about 20 ms to about 100 ms, and the width of the short pulse is about 5 ns.

In the laser device 100 having the above structure according to the present invention, if the laser beam having the wavelength of 1064 nm is irradiated to the high reflector mirror 60 through the pulse generator 10, the laser beam is output to the pulse output section 70 through the amplification and resonance processes between the high reflector mirror 60 and the output coupler mirror 30. Since the amplification and resonance mechanism of the laser beam and the pulse generator 10 are based on the technology of the Nd-YAG laser device generally known to those skilled in the art, the detailed description about the technical structure and the operation thereof will be omitted.

Figure 2:
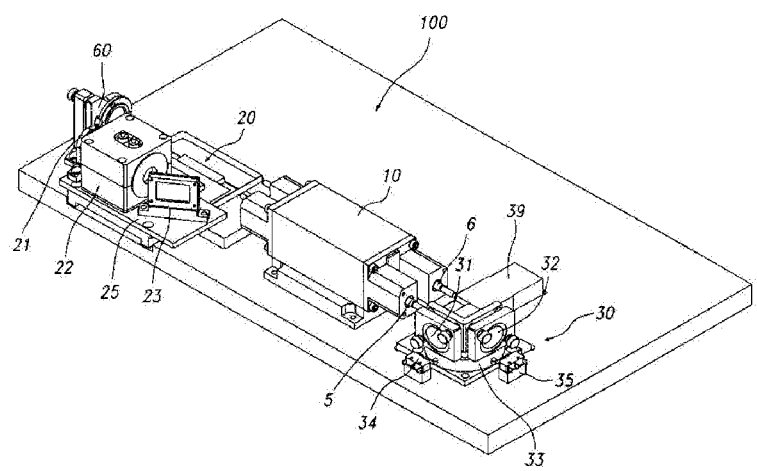
FIG. 2 is a perspective view showing the laser device according to the present invention in a state in which a Q switch moves backward.
Figure 3:
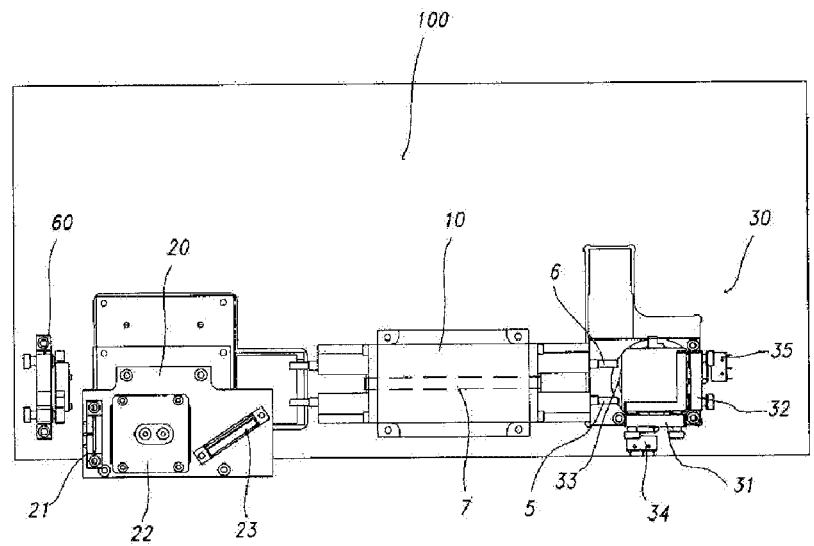
FIG. 3 is a plan view of FIG. 2.
Figure 4:
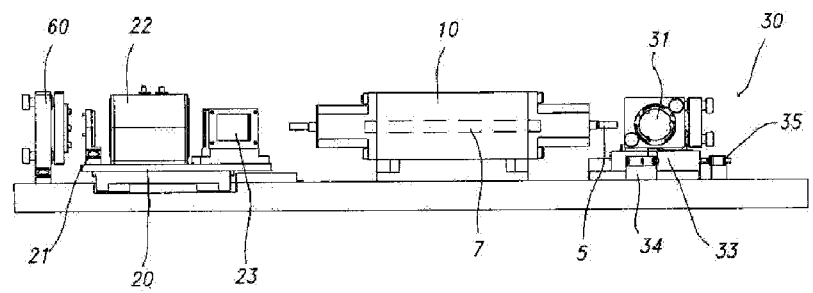
FIG. 4 is a sectional view of FIG. 2.

When the laser beam having the wavelength of 1064 nm is irradiated to the high reflector mirror 60 through the pulse generator 10, and if the Q switch 20 deviates from the optical path of the laser beam as shown in FIG. 2, the laser beam having the 1064-nm long pulse is output to the pulse output section 70 through the output coupler mirror 30. If the Q switch 20 is positioned on the optical path of the laser beam as shown in FIG. 5 to perform Q-switching, the laser beam having the long pulse is transformed into a laser beam having the 1064-nm short pulse representing the short pulse width and high energy, and output to the pulse output section 70 through the output coupler mirror 30.

The Q switch 20 includes a quarter-wave mirror 21, a polarizer mirror 23, and a pockels cell 22 interposed between the quarter-wave mirror 21 and the polarizer mirror 23. Hereinafter, the operation of the Q switch 20 will be described in more detail.

When the quarter-wave mirror 21 and the polarizer mirror 23 are positioned on the optical path of the laser beam between the high reflector mirror 60 and the pulse generator 10 as shown in FIG. 5, the maximum of density reversion of the laser beam occurs by the quarter-wave mirror 21 and the polarizer mirror 23. At the moment at which the maximum of the density reversion of the laser beam occurs, the pockels cell 22 is instantaneously open due to high voltage to act as an electro-optical shutter.

Accordingly, if the Q switch 20 moves onto the optical path of the laser beam, the laser beam having the 1064 nm long pulse is transformed into the laser beam having the 1064 nm short pulse representing a short pulse width and high power energy.

The technology of the Q switch 20 may be generally known to those skilled in the art.

Meanwhile, the output coupler mirror 30 includes the first and second mirrors 31 and 32 to selectively receive the laser beam having the 1064 nm long pulse or the 1064 nm short pulse as the Q switch 20 moves backward or forward.

The Q switch 20 including the quarter-wave mirror 21, the pockels cell 22, and the polarizer mirror 23 is mounted on the movable plate 25, and the movable plate 25 may move backward or forward in a direction perpendicular to the optical path between the pulse generator 10 and the high reflector mirror 60.

The movable plate 25 is driven by the movable plate driver 26, and the movable plate driver 26 includes a support plate 27 provided thereon with a rack gear 27a having a linear phase, a guide plate 28 including guide sections 28a and 28b to guide the movement of the support plate 27, and a driving motor 29 installed at one side portion of the guide plate 28 and shaft-coupled with the rack gear 27a.

The driving gear 27a is engaged with the rack gear 27a of the support plate 27 seated on the guide plate 28, so that the support plate 27 performs straight line motion along the guide sections 28a and 28b of the guide plate 28.

The output coupler mirror 30 according to the present invention includes the first and second mirrors 31 and 32 aligned on the base plate 33 having the form of a circular plate while forming a right angle therebetween, the rotational position of the base plate 33 is adjusted by a rotational plate driver 39, and the control position of the base plate 33 is detected by limit switches 34 and 35, so that the first and second mirrors 31 and 32 are selectively arranged through the above switching operation. The second mirror 32 receives the laser beam having the 1064 nm long pulse, which is not subject to Q switching, to output the laser beam to the pulse output section 70, and the first mirror 31 receives the laser beam having the 1064 nm short pulse, which is not subject to the Q switching, to output the laser beam to the pulse output section 70. The first and second mirrors 31 and 32 must be installed such that the laser beam output from the pulse generator 10 can be received at the same position.

Since the driver to drive the base plate 33 can be easily realized through a timing belt or a worm gear by those skilled in the art, the details of the driver will be omitted.

When the laser device 100 having the above structure according to the present invention outputs the 1064 nm long pulse laser beam, the Q switch 20 is positioned on the optical path of the laser beam in the form of a straight line with the rod 7 for the medium of the pulse generator 10 such that the second mirror 32 of the output coupler mirror 30 receives a laser beam output from the pulse generator 10 to output the laser beam to the pulse output section 70 in a state in which the Q switch 20 is positioned off the optical path of the laser beam between the pulse generator 10 and the high reflector mirror 60.

In contrast, When the laser device 100 outputs the laser beam having the 1064 nm short pulse, the Q switch 20 is positioned on the optical path of the laser beam between the pulse generator 10 and the high reflector mirror 60 such that the quarter-wave mirror 21, the pockels cell 22, and the polarizer mirror 23 are positioned on a linear optical path of the laser beam, and the first mirror 31 of the output coupler mirror 30 receives the laser beam output from the pulse generator 10 to output the laser beam to the pulse output section 70. The Q switch 20 is positioned on the optical path forming a straight line with the rod 7 for the medium of the pulse generator 10 such that the second mirror 32 of the output coupler mirror 30 receives a laser beam output from the pulse generator 10 to output the laser beam to the pulse output section 70 in a state which the Q switch 20 is positioned off the optical path of the laser beam between the pulse generator 10 and the high reflector mirror 60.

Figure 14:
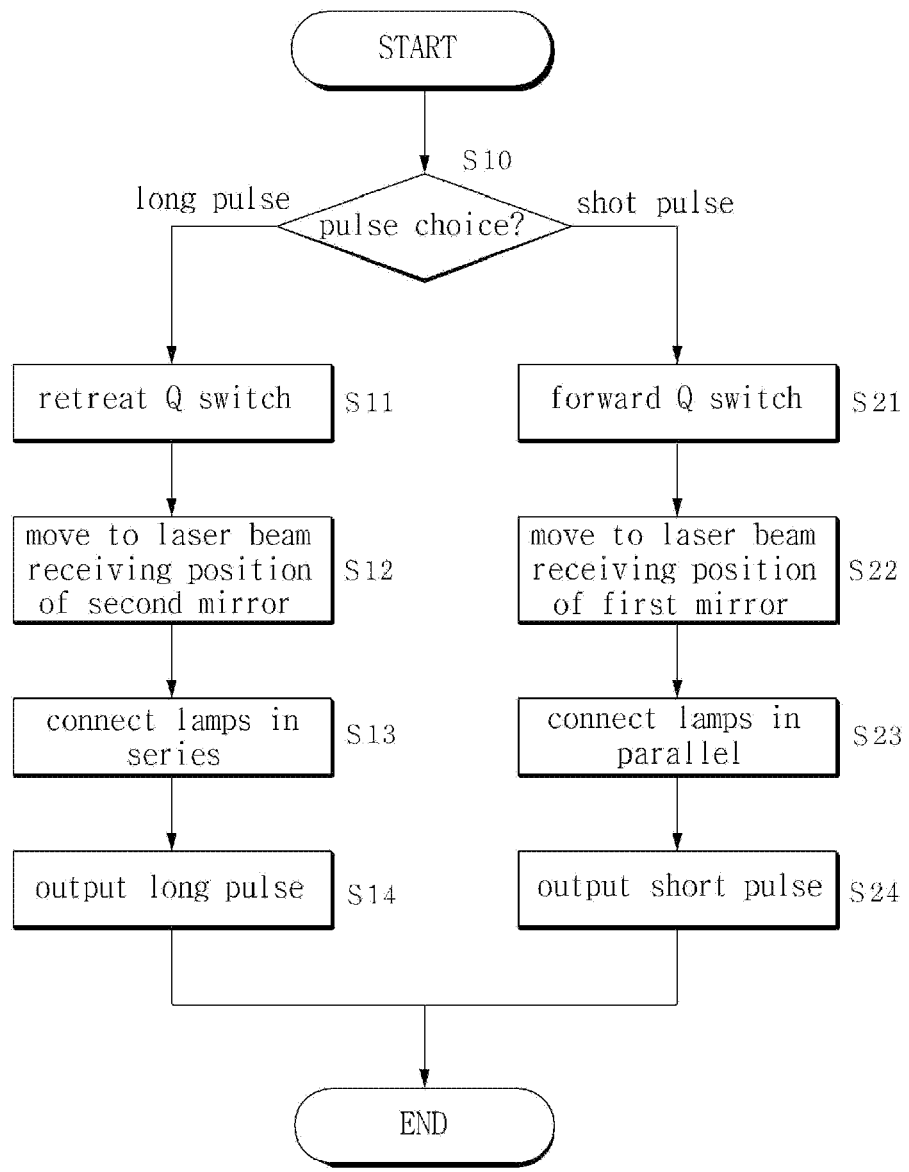
FIG. 14 is a flowchart showing the operating procedure of the laser device according to the present invention.

Hereinafter, the operation of the laser device 100 having the above structure according to the present invention will be described in detail with reference to FIG. 14.

The CPU 50 determines if a user selects a long-pulse output mode or a short-pulse output mode of the laser device 100 (step S10).

If the user selects the long-pulse output mode, the CPU 50 drives the driving motor 29 to retreat the Q switch 20 mounted on the movable plate 25 from an optical path of the laser beam (step S11).

Thereafter, the CPU 100 rotates the base plate 33 such that the second mirror 32 constituting the output coupler mirror 30 receives the laser beam output from the pulse generator 10 to output the laser beam to the pulse output section 70 (step S12).

The rotation position of the second mirror 32 is exactly controlled by the rotation plate driver 39 and detected by the limit switch 34 or 35.

Then, the CPU 100 switches the connection of a lamp power circuit such that the lamps 5 and 6 of the pulse generator 10 are connected to each other in series (step S13).

If the Q switch 20 moves backward from the optical path, the second mirror 32 moves to a position to receive the laser beam, and the lamps 5 and 6 of the pulse generator 10 are connected to each other in series, a 1064 nm laser beam generated from the pulse generator 10 is output to the pulse output section 70 while representing the form of a long pulse through the amplification and the resonance processes between the high reflector mirror 60 and the second mirror 32 of the output coupler mirror (step S14).

Meanwhile, if the short-pulse output mode is selected, the CPU 50 drives the driving motor 29 to allow the driving motor 29 to move forward to the optical path of the laser beam, which is formed in line with the rod 7 for the medium of the pulse generator so that the quarter-wave mirror 21, the pockels cell 22, and the polarizer mirror 23 are arranged in line with each other on the optical path of the laser beam (step S21).

Thereafter, the CPU 50 rotates the base plate 33 such that the first mirror 31 constituting the output coupler mirror 30 receives the laser beam output from the pulse generator 10 to output the laser beam to the pulse output section 70 (step S22).

Then, the CPU 100 switches the connection of the lamp power circuit such that the lamps 5 and 6 of the pulse generator 10 are connected to each other in parallel (step S23).

If the Q switch 20 moves forward to the optical path, the first mirror 31 moves to the position to receive the laser beam, and the lamps 5 and 6 of the pulse generator 10 are connected to each other in parallel, the 1064 nm laser beam, which is amplified and resonates between the high reflector mirror 60 and the first mirror 31 of the output coupler mirror, is subject to the maximum of density reversion by the quarter-wave mirror 21 and the polarizer mirror 23. At the moment at which the maximum of the density reversion of the laser beam occurs, the pockels cell 22 is instantaneously open due to high voltage, called by a shutter operation, to transform the 1064 nm laser beam into a short-pulse laser beam having a shorter pulse width and representing high power energy, and output the laser beam to the pulse output section 70 (step S24).

The laser device 100 according to the present invention is not limited to the structure and the operation shown in accompanying drawings, but can be variously modified within the technical scope of claims and objects of the present invention.

Although the pulse generator 10 according to the present invention includes a pair of the lamps 5 and 6 while interposing the rod 7 for the medium, which is obtained by doping $Nd^{3+}$ ions into a YAG crystal, therebetween and transits a series connection state of the lamps 5 and 6 into a parallel connection state thereof, so that the output intensity of light emitted from the lamps 5 and 6 is enhanced, the pulse generator 10 may include the lamps 5 and 6 installed at one side or both sides of the rod 7, and a power adjusting device, which is generally known to those skilled in the art, installed to randomly adjust the illuminance of the lamps 5 and 6.

The laser device according to the present invention may be applicable to medical fields similarly to a device to irradiate a laser beam to a skin of a human.

What is claimed is:

1. A laser device comprising:
   a pulse generator which irradiates a laser beam between a high reflector mirror and an output coupler mirror to amplify and resonate the laser beam;
   a pulse output section which receives a laser beam pulse amplified and resonated through the output coupler mirror to output the laser beam pulse; and
   a Q switch which moves backward or forward in a direction perpendicular to a path of the laser beam formed between the pulse generator and the high reflector mirror,
   wherein the output coupler mirror includes at least one mirror provided on a base plate, and
   wherein the output coupler mirror includes first and second mirrors and positions of the first and second mirrors are selectively changed as the Q switch moves backward or forward.

2. The laser device of claim 1, wherein the first and second mirrors are aligned on the base plate while forming a right angle therebetween.

3. The laser device of claim 2, wherein the base plate provided thereon with the first and second mirrors includes a rotatable circular plate, and a rotation plate driver, which restricts a rotation of the base plate, and at least one limit switch, which detects a rotational angle of the base plate, are installed around the base plate.

4. The laser device of claim 1, wherein the Q switch is mounted on a movable plate, and the movable plate moves backward or forward perpendicularly to the path of the laser beam formed between the pulse generator and the high reflector mirror by driving the movable plate driver provided below the movable plate.

5. The laser device of claim 1, wherein the pulse generator includes an illuminance switching unit to adjust illuminance of the laser beam as the Q switch moves backward or forward.

6. The laser device of claim 5, wherein the pulse generator includes a pair of lamps to emit light using a medium obtained by doping $Nd^{3+}$ ions into a YAG crystal, and the illuminance switching unit includes a switching circuit allowing the lamps to be connected to each other in series or in parallel.

7. The laser device of claim 5, wherein the pulse generator includes one lamp to emit light using a medium obtained by doping $Nd^{3+}$ ions into a YAG crystal, and the illuminance switching unit includes a power adjusting unit to adjust the output of the lamp.

8. The laser device of claim 4, wherein the Q switch includes a quarter-wave mirror, a polarizer mirror, and a pockels cell provided between the quarter-wave mirror and the polarizer mirror, and
   wherein, when the quarter-wave mirror and the polarizer mirror are positioned on a path of a laser beam formed between the high reflector mirror and the pulse generator, the pockels cell is instantaneously and repeatedly open due to high voltage at a moment at which maximum of density reversion of the laser beam occurs, to act as an electro-optical shutter.

* * * * *